(12) United States Patent
Walker

(10) Patent No.: US 10,524,571 B1
(45) Date of Patent: Jan. 7, 2020

(54) HEAVY DUTY BRACKET FOR MULTI-LEVEL CANTILEVER SHELVES

(71) Applicant: Roger D. Walker, Longmont, CO (US)

(72) Inventor: Roger D. Walker, Longmont, CO (US)

( * ) Notice: Subject to any disclaimer, the term of this patent is extended or adjusted under 35 U.S.C. 154(b) by 0 days.

(21) Appl. No.: 16/405,160

(22) Filed: May 7, 2019

Related U.S. Application Data

(60) Provisional application No. 62/667,779, filed on May 7, 2018.

(51) Int. Cl.
| A47B 96/06 | (2006.01) |
| F16M 13/02 | (2006.01) |
| A47B 96/02 | (2006.01) |
| E04G 5/06 | (2006.01) |
| A47B 57/46 | (2006.01) |

(52) U.S. Cl.
CPC .......... *A47B 96/061* (2013.01); *A47B 96/024* (2013.01); *A47B 96/028* (2013.01); *F16M 13/02* (2013.01); *A47B 57/46* (2013.01); *A47B 96/067* (2013.01); *E04G 5/06* (2013.01); *E04G 5/062* (2013.01)

(58) Field of Classification Search
CPC ... A47B 96/061; A47B 96/028; A47B 96/024; A47B 96/067; A47B 57/46; E04G 5/06; E04G 5/092; E04G 5/062
See application file for complete search history.

(56) References Cited

U.S. PATENT DOCUMENTS

| 1,579,556 | A | * | 4/1926 | Mckenzie | ............ | A47B 96/061 248/248 |
| 1,931,321 | A | * | 10/1933 | Keil | ........................ | A47B 57/46 248/243 |
| 2,268,237 | A | * | 12/1941 | Beegle | ................... | A47B 47/00 248/235 |
| 2,304,658 | A | * | 12/1942 | Sanford | ............... | A47B 96/061 248/241 |

(Continued)

FOREIGN PATENT DOCUMENTS

EP 0750869 A1 * 1/1997 ............. A47B 57/56

*Primary Examiner* — Eret C McNichols
(74) *Attorney, Agent, or Firm* — Patent Law Offices of Rick Martin, P.C.

(57) ABSTRACT

A wall mounted shelf wherein a diagonal bracket can support an upper shelf, bar or beam several inches above the vertical wall bearing plate. A lower shelf, bar or beam can be hung from the upper shelf. A triangular platform comprises the diagonal bracket, the wall and a top shelf. The diagonal bracket transmits a large force vector into the vertical wall bearing plate as opposed to traditional knee braces that transmit a pivoting vector on the vertical wall bearing plate away from the wall. The result is a cost saving heavy duty shelving system using traditional lumber. An optional variable length diagonal bracket is disclosed. Another embodiment uses the same diagonal pair of brackets to store tires or other objects against the wall and eliminates the shelves and provides a chin up bar. Another embodiment replaces the lower shelf with a chin up bar between two diagonal brackets. Other embodiments include a tire storage mode, a (Continued)

lower bar used for hanging storage which replaces the lower shelf, and a (partially) removed lower shelf for hanging storage such as a bike rack.

2 Claims, 15 Drawing Sheets

(56) References Cited

U.S. PATENT DOCUMENTS

| | | | | | |
|---|---|---|---|---|---|
| 2,429,586 | A | * | 10/1947 | Rompre | A47B 96/061 248/248 |
| 2,588,995 | A | * | 3/1952 | Setvate | A47B 96/025 108/59 |
| 2,859,879 | A | * | 11/1958 | Rogers | A47B 96/027 211/90.01 |
| 3,493,202 | A | * | 2/1970 | Jensen | A47B 96/061 248/538 |
| 3,494,582 | A | * | 2/1970 | Nemeth | A47B 96/061 211/107 |
| 3,702,591 | A | * | 11/1972 | Banse | A47B 96/027 108/31 |
| 4,316,593 | A | * | 2/1982 | Miner | A47F 5/14 211/90.03 |
| 4,361,099 | A | * | 11/1982 | Kokenge | F16B 5/123 108/108 |
| 4,374,498 | A | * | 2/1983 | Yellin | A47B 55/02 108/152 |
| 4,662,595 | A | * | 5/1987 | Camilleri | A47B 96/00 108/42 |
| 4,700,845 | A | * | 10/1987 | Fretter | B62H 3/12 211/17 |
| 4,783,035 | A | * | 11/1988 | Remmers | A47B 96/061 211/134 |
| 4,854,534 | A | * | 8/1989 | Porter | A47B 96/061 248/222.14 |
| 5,257,766 | A | * | 11/1993 | Riblet | A61K 47/6845 248/248 |
| 5,310,148 | A | * | 5/1994 | Dorr | A47B 96/061 211/105.1 |
| 5,423,504 | A | * | 6/1995 | Shenkar | A47B 96/061 211/88.03 |
| 5,582,303 | A | * | 12/1996 | Sloan | A47G 25/0692 211/105.1 |
| 5,647,490 | A | * | 7/1997 | Hull | A47B 61/003 108/29 |
| 5,755,416 | A | * | 5/1998 | Leek | A47B 96/061 248/247 |
| 6,053,465 | A | * | 4/2000 | Kluge | A47B 61/003 248/201 |
| 6,267,063 | B1 | * | 7/2001 | Cline | A47B 96/061 108/42 |
| 6,375,137 | B1 | * | 4/2002 | McQuade | A47B 96/061 248/205.1 |
| 7,249,685 | B2 | * | 7/2007 | Newman | A47B 43/00 211/87.01 |
| 7,497,343 | B2 | * | 3/2009 | Newman | A47B 43/00 211/87.01 |
| 10,021,974 | B2 | * | 7/2018 | Beuses | A47B 61/003 |
| 2002/0178976 | A1 | * | 12/2002 | Bohnacker | A47B 96/061 108/108 |
| 2005/0109901 | A1 | * | 5/2005 | Stitchick | A47B 47/022 248/235 |
| 2009/0008849 | A1 | * | 1/2009 | Cunningham | A47B 96/061 269/79 |
| 2009/0294623 | A1 | * | 12/2009 | Pinchuk | A47B 96/061 248/546 |
| 2010/0270445 | A1 | * | 10/2010 | Johnson | A47B 96/061 248/201 |
| 2014/0027589 | A1 | * | 1/2014 | Durgin | A47B 96/061 248/218.4 |
| 2016/0100685 | A1 | * | 4/2016 | Tibbe | A47B 96/061 248/218.4 |
| 2017/0280874 | A1 | * | 10/2017 | Sosso | A47B 96/07 |
| 2018/0206640 | A1 | * | 7/2018 | Drew | A47B 61/003 |
| 2019/0239646 | A1 | * | 8/2019 | Newman | A47B 96/028 |
| 2019/0239647 | A1 | * | 8/2019 | Newman | A47B 96/02 |

* cited by examiner

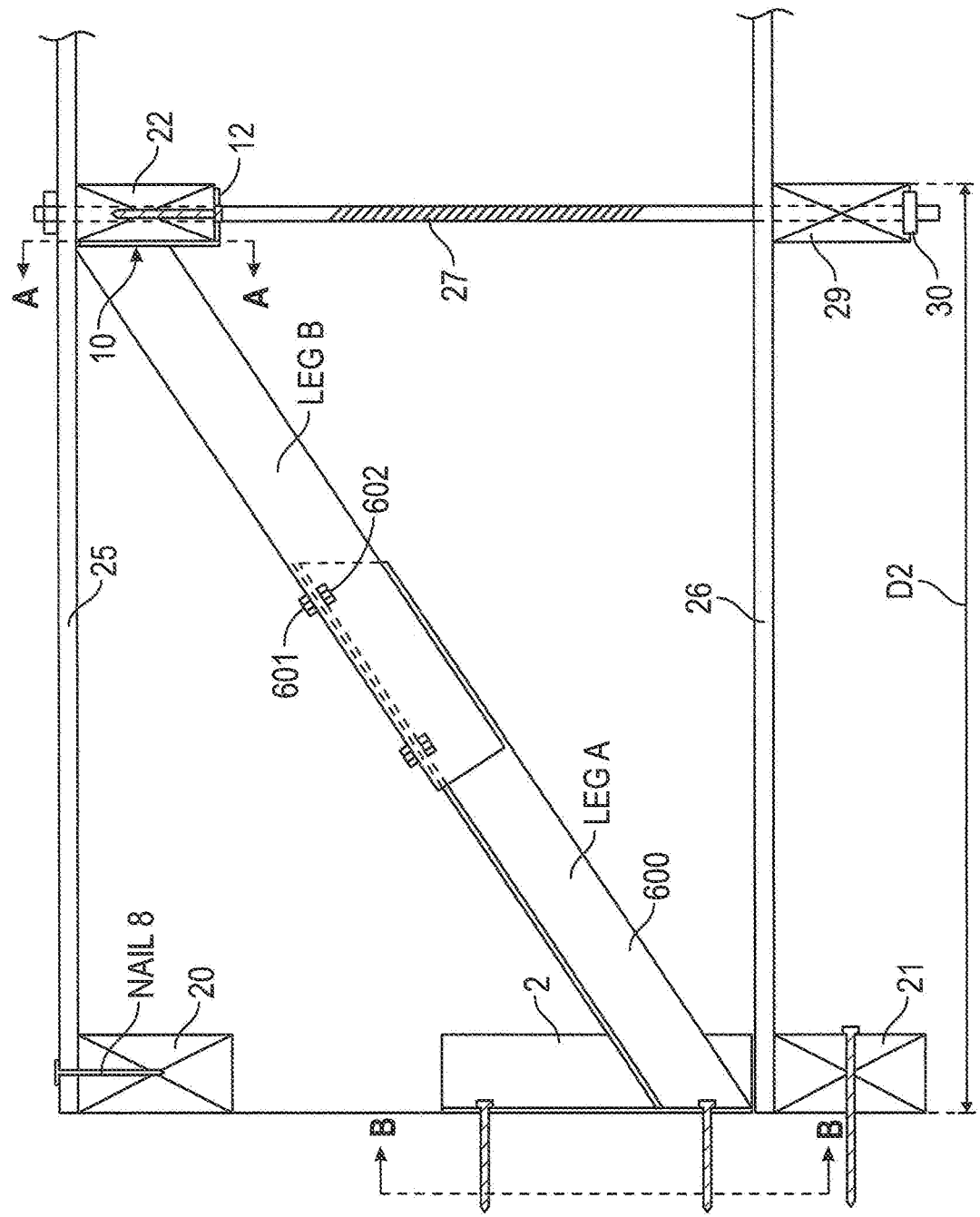

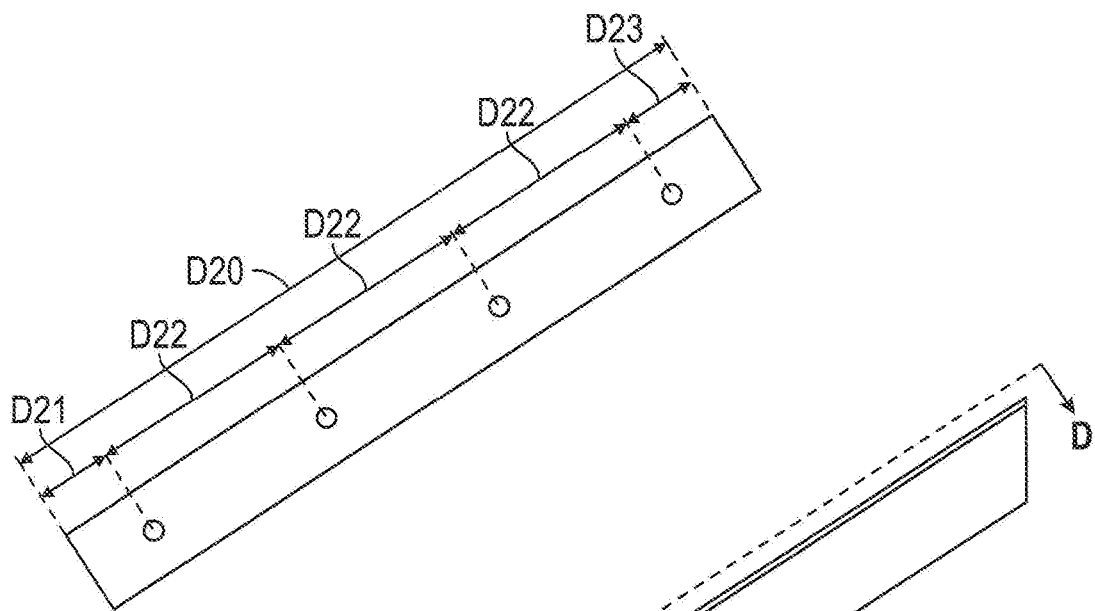
FIG. 8A
FIG. 8B
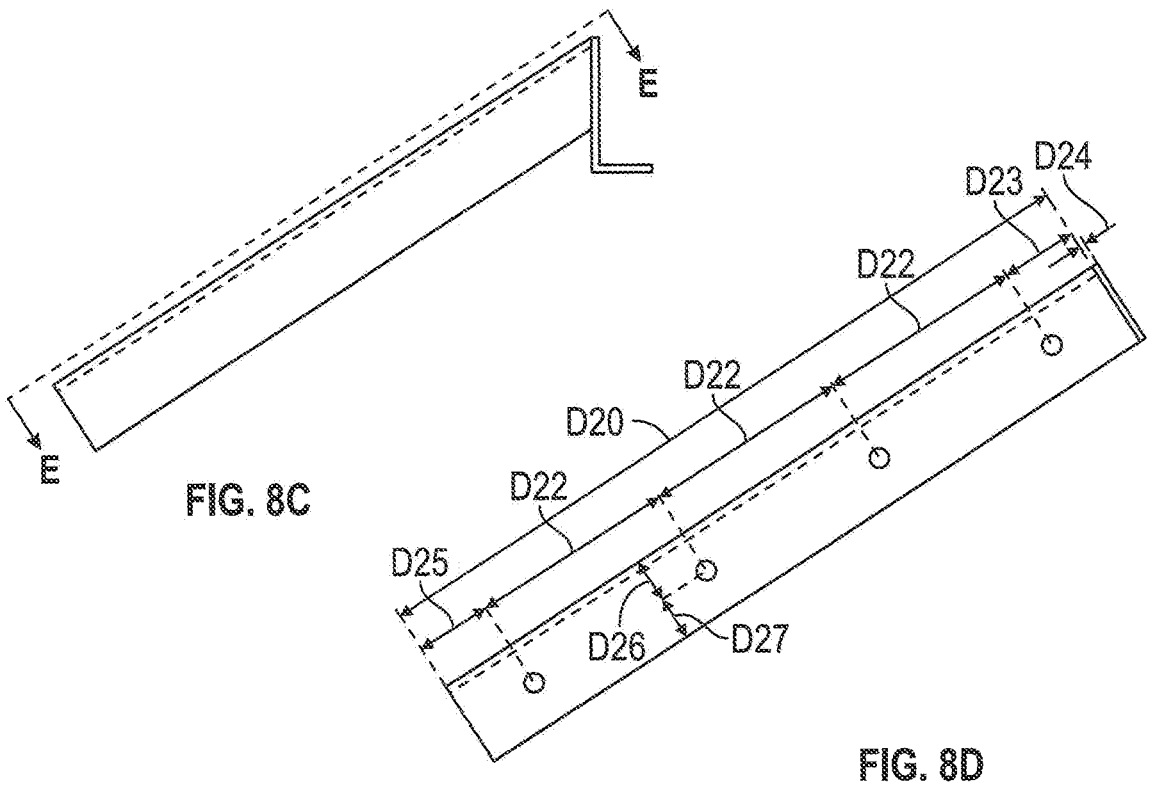
FIG. 8C
FIG. 8D

HEAVY DUTY BRACKET FOR MULTI-LEVEL CANTILEVER SHELVES

CROSS REFERENCE PATENTS

This application claims benefit of provisional application Ser. No. 62/667,779 filed May 7, 2018 which is incorporated herein by reference in its entirety.

FIELD OF INVENTION

The present invention relates to providing (metal) wall mounted brackets that form a triangular support frame for an upper shelf, wherein lower shelves may be supported therefrom.

BACKGROUND OF THE INVENTION

Shelf brackets with diagonal braces have been known in the art for many years, for example, those in U.S. Pat. Nos. 476,994 (Ellis), U.S. Pat. No. 498,027 (Recht), and U.S. Pat. No. 2,908,471 (Hollansworth). Further, to cause the diagonal brace to be removable is taught by Recht. The type of brace taught by Recht, however, does not significantly stabilize the bracket against lateral stresses. Further, while the brace of Ellis does tend to stabilize against lateral stresses, it is not removable for handy shipping and is dependent upon crimping of the leg metal over it to hold it in place under stress. With overloading, this crimped bracket is subject to drastic failure by the brace breaking loose from the crimp.

U.S. Pat. No. 3,695,569 discloses a unique type of shelf bracket assembly that specially interconnects the brace with the bracket legs. By so doing, the novel bracket assembly is collapsible for handy, inexpensive shipping, has excellent stability against lateral stresses, and is not dependent upon nor requires crimping for vertical bracing support. Moreover, the bracket assembly has the further versatility of enabling items to be supported on the outer end of the brace, with the load being transmitted to the bracket leg.

U.S. Pat. No. 8,864,088 discloses a bracket for wood shelving. The bracket comprises a main body defining a first lower support feature configured to receive a first piece of wood in a vertical orientation. The main body further defines a second lower support feature configured to receive a second piece of wood in a vertical orientation such that a top surface of the first piece of wood and a top surface of the second piece of wood align to form a lower shelf support surface for supporting a lower shelf. The main body further defines a first upper support feature configured to receive a third piece of wood in a vertical orientation. The main body further defines a second upper support feature configured to receive a fourth piece of wood in a vertical orientation such that a top surface of the third piece of wood and a top surface of the fourth piece of wood align to form an upper shelf support surface for supporting an upper shelf.

In some embodiments, the first and second lower support features and first and second upper support features; are each configured to receive a standard-sized piece of wood. In some embodiments, the first lower support feature is configured to receive a 2×6 piece of wood and the second lower support feature is configured to receive a 2×4 piece of wood such that the top surface of the 2×6 piece of wood extends in the same plane as the top surface of the 2×4 piece of wood.

What is needed in the art is a bracket for wall mounted shelves, bars or beams in a variety of configurations. One embodiment should support a heavy weight multi shelf assembly using upper and a lower horizontal wall mounted beams such as 2×4's. The present invention provides a (metal) bracket that is secured to a wall (on a stud) and projects a diagonal strut which holds a 2×4, bar or beam across a pair of such brackets. A top shelf rests atop the 2×4 and a wall mounted 2×4 several inches above the bracket's wall fasteners. A large portion of the weight on the upper shelf is vectored into compression of the bracket into the wall as opposed to a traditional vector that urges the bracket away from the wall. Optional lower shelves, bars or beams are hung from the diagonal strut supported upper shelf and a lower wall mounted 2×4.

SUMMARY OF THE INVENTION

The main aspect of the present invention is to provide a pair of shelf, bar or beam supporting brackets that transfers a large portion of the load to the wall in compression.

Another aspect of the present invention is to use a wall mounted horizontal beam (2×4) to support a back edge of a top shelf, thereby forming a triangular support frame.

Another aspect of the present invention is to use a diagonal strut projecting from a vertical stud mounted brace on the bracket to extend above the vertical stud mounted brace, thereby creating a large compression vector on the diagonal strut into the wall.

Another aspect of the present invention is to hang a lower shelf, bar or beam from the diagonal strut supported upper shelf, bar or beam, and use a lower wall mounted 2×4 to support a back edge of a lower shelf.

Another aspect of the present invention is to provide an extendable diagonal strut.

Another aspect of the present invention is to hang a plurality of lower shelves, bars or beams, each shelf, bar or beam supported by rods hung from the bracket.

Another aspect of the present invention is to make the bracket from standard two inch angle iron which is strong, inexpensive, and easy to weld.

Another aspect of the present invention is to accommodate standard lumber cut dimensions minimizing any lumber waste.

The present invention has superior features to the "Big Bear"™ invention of U.S. Pat. No. 8,864,088. The present invention is denoted as a "Monster Bracket" (MB).

Other aspects of this invention will appear from the following description and appended claims, reference being made to the accompanying drawings forming a part of this specification wherein like reference characters designate corresponding parts in the several views.

The present invention is labeled Monster Brackets herein: Monster Brackets (MB) are essentially the knee brace of a shelf, bar or beam support system. They are incorporated into the structural lumber framing of the shelf system. But rather than supporting the bottom shelf bar or beam, or each shelf as conventional brackets do, MB supports the upper shelf, bar or beam and allows one or more lower shelves bars or beams, to be hung from the MB of the upper shelf, bar or beam.

The forces on conventional brackets create a moment arm that wants to pull the upper fasteners out of the wall. Forces on conventional brackets want to pivot from their lower contact point with the wall thereby pulling the upper fasteners to the wall out of the wall-putting the upper fasteners in tension thereby requiring the upper fasteners to resist failure by the withdrawal strength of the upper fasteners alone.

MB transfers the load to the wall in compression. The structural lumber framing of the MB upper shelf is screwed together and to the wall forming the upper leg of a structural triangle. Structural lumber framing resists the majority of tensile forces. The wall is the vertical leg of the triangle and the MB is the hypotenuse functioning in compression.

MB are designed to accommodate standard lumber cut dimensions minimizing any lumber waste. The fixed MB is designed to receive a 24" (half of a 4'×8' plywood sheet) lower shelf, bar or beam. The adjustable MB is designed to receive a 16" or 20" or 24" lower shelf, bar or beam. Vertical separation of shelves is variable and is up to the installer and limited only to the distance between the floor and ceiling. 18" is the minimum separation for the fixed MB and 12¼" for the adjustable MB.

MB are designed to receive standard 2"×4" dimensional lumber but 2"×6", or 2"×8", or larger lumber may be used. One or more lower shelves, bars or beams are suspended from the upper MB by ⅜" threaded rod but larger diameter threaded rod can be used for added load. Structural lumber framed shelves supported by posts in compression extending to the floor are the conventional method for constructing heavy duty shelves. Posts use up floor space. MB replaces the posts.

Differences Between MB and Big Bear (BB):
1. MB-multiple configurations of applications
2. BB-fixed configuration
3. BB-odd cut shelf dimensions (smaller lower shelf)
4. BB-smaller shelves-20" & 9"
5. MB larger shelves-32" & 24" (two of the same size)
6. BB-10" high lower shelf, fixed
7. MB-variable height lower shelf, 14" minimum
8. BB-lower shelf leaves a 2" space between the back of the shelf and the wall
9. BB-a moment arm (tensile withdrawal) does not transfer as much load to the wall in compression
10. MB-⅜"×3" lag screws
11. BB-5/16"×2" lag screws
12. MB-any size lumber
13. BB published capacities with two (2) brackets 8' (L)×19.75"(D)×20"(H), 29 SF of shelf storage space, 425 lbs capacity
14. MB design capacities with two (2) brackets 8' (L)×32" upper and 24" lower shelf, 37 SF of shelf storage space, 1000 lbs capacity
15. MB is metal and BB is plastic.

"Monster Brackets" for deep floating shelves, bars or beams are the solution for garage clutter and storage in tight spaces. Construct a top level of wall-mounted shelving, bars or beams with "Monster Brackets". Then suspend from that Monster Bracket more levels of shelving, bars or beams below. One "Monster Bracket" replaces a conventional bracket for all shelves below. "Monster Brackets" eliminate posts that obstruct the floor space below and knee-braces that obstruct headroom. In a typical 2-car garage, for example, "Monster Brackets" can add 200 square feet or more of surface storage off the floor—an amount equal to the surface area of a one car garage.

Each space and application are unique. Determine where and the amount of shelving needed. Mount "Monster Brackets" onto the wall studs of the existing walls. The 2×4 framing that supports the shelves carries the load. "Monster Brackets" transfer that load to the wall studs. If, for example, it's determined that a 2×4 that is supported every 4' can carry the load envisioned, then one "Monster Bracket" roughly every 4' is what would be installed. The "Monster Brackets" support the upper shelf, bar or beam. The lower shelf(s) are suspended from the upper MB by an all-thread rod. Hence, there are no posts that obstruct the floor and no-knee-braces that impact headroom below the lower shelf, bar or beam.

BRIEF DESCRIPTION OF THE DRAWINGS

FIG. 7 is a left side elevation view of the extendable diagonal strut bracket.
FIG. 8A is a top plan view of LEG A as seen along line D-D of FIG. 8B.
FIG. 8B is a left side elevation view of LEG A.
FIG. 8C is a left side elevation view of LEG B.
FIG. 8D is a top plan view of LEG B as seen along line E-E of FIG. 8C.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
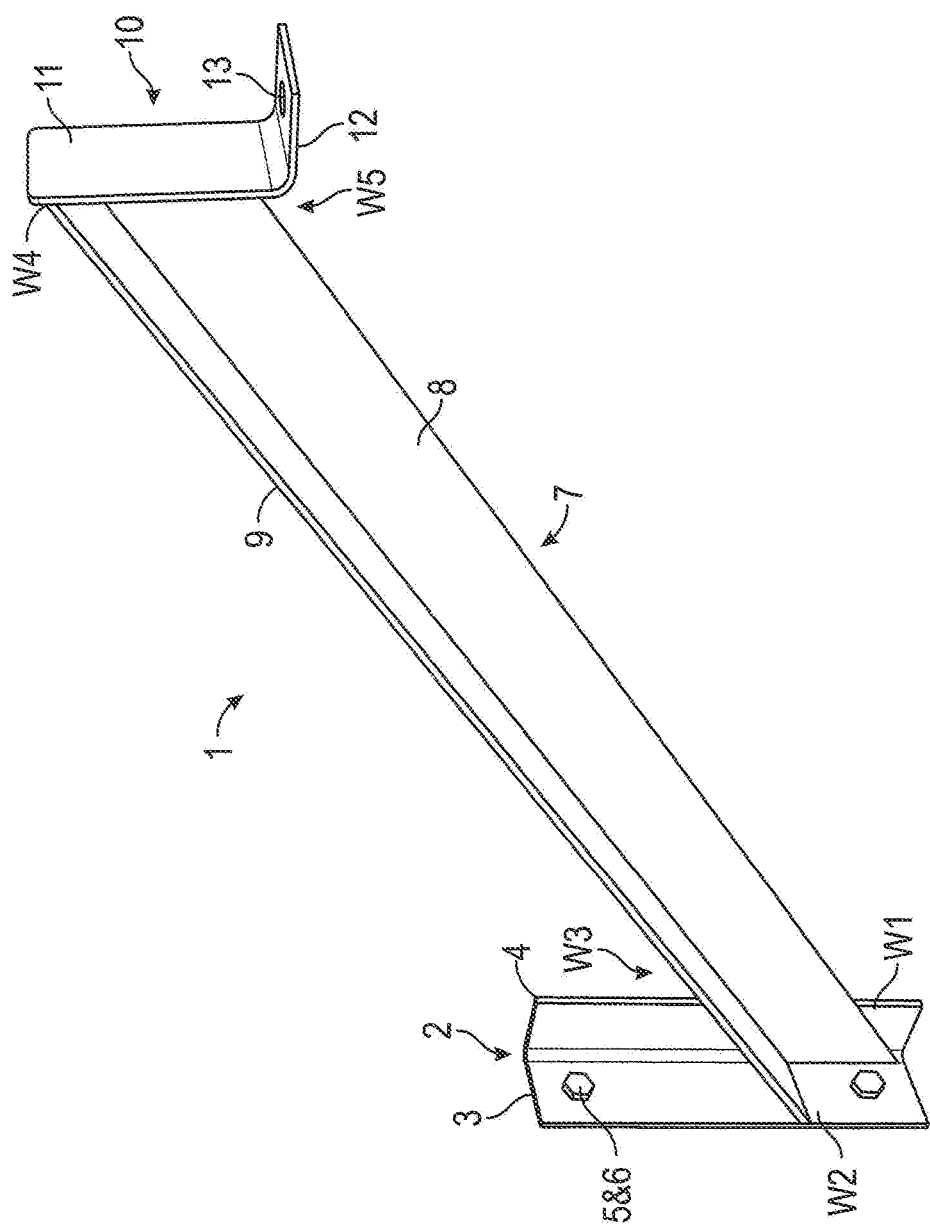
FIG. 1 is a front perspective view of the shelf bracket.

Referring first to FIGS. 1, 2 wall bracket 1 is fabricated with 2"×2"×⅛" steel angle. They are designed for shelves to be a minimum of 24" deep, but can be deeper. They are designed for shelves, bars or beams to be a minimum of 18" tall, but can be taller. Install the wall brackets then construct the shelving, bars or beams with locally available building products including 2×4 lumber, plywood, threaded-rod, steel-pipe and associated fasteners and hardware.

A vertical wall mounted bearing plate 2 has a wall mount segment 3 and a 90 degree stiffening segment 4. Holes 5 receive lag bolts 6 which fasten into studs if available. The diagonal strut 7 has a (nominal two inch) vertical segment 8 and (nominal two inch) horizontal segment 9. An L shaped hanger bracket 10 has a vertical segment 11 and a horizontal leg 12 with a hole 13. Welds are labeled W1, W2, W3, W4, W5. Wall mounted segment 3 may have two or three holes 5. Nominal dimensions include D1=27", D2=8", D3=2", D4=24", D5=32", D6=1½", D7=3½", D8=14", D9=18" minimum, D10=½", D11=3½". The top support beam (2×4) is labeled 20, and the optional lower support beam (2×4) is labeled 21. The outboard support beam (2×4) 22 is drilled to accept lag screw 231 through hole 24. The upper shelf 25 rests on support beams 20, 22. If the optional lower shelf 26 is added, then a drop rod 27 can be threaded through hole 24 bolted with nut & washer 28, threaded through support beam 22 and lower shelf 26, and threaded through support beam 29, and bolted with nut & washer 30. Lower shelf 26 is supported by lower support beam 21 and drop rod 27 and lower support beam 29.

Figure 2A:
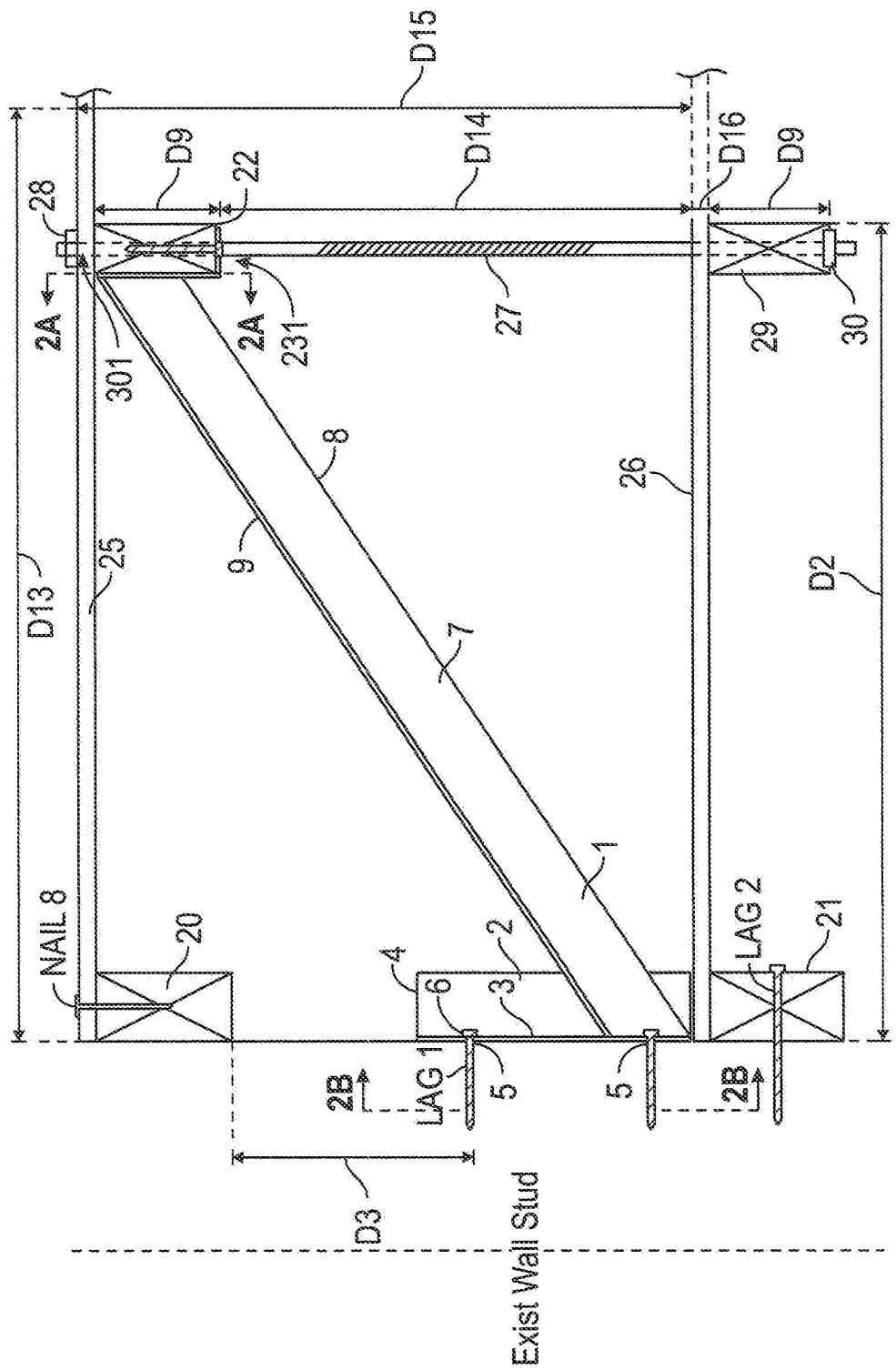
FIG. 2A is a left side elevation view of the shelf bracket.
Figure 2B:
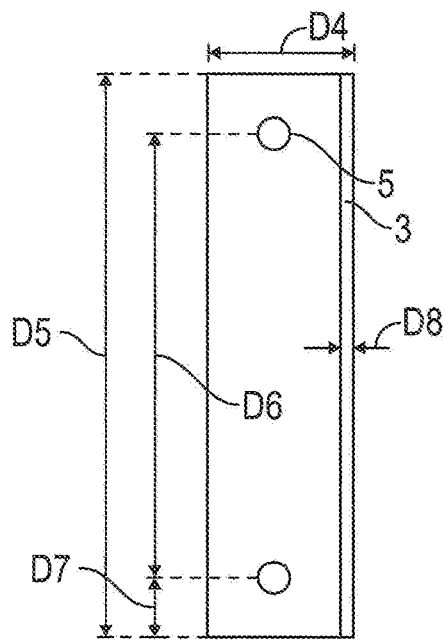
FIG. 2B is an end view taken along line B-B of FIG. 2A.
Figure 2C:
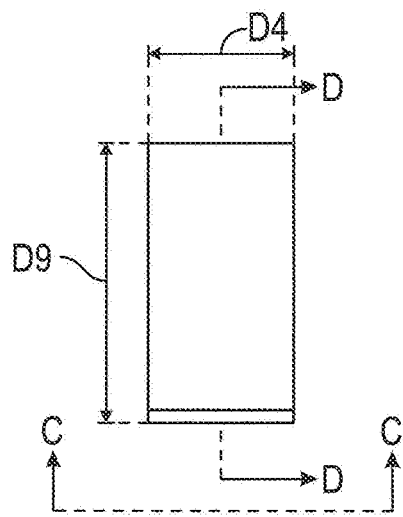
FIG. 2C is an end view taken along line A-A of FIG. 2A.
Figure 2D:
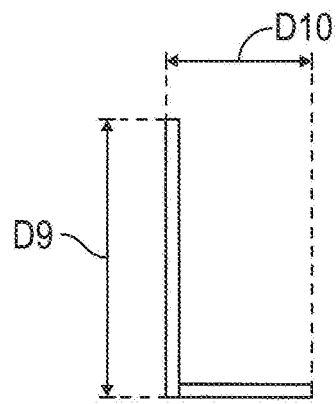
FIG. 2D is an end view taken along line D-D of FIG. 2C.
Figure 2E:
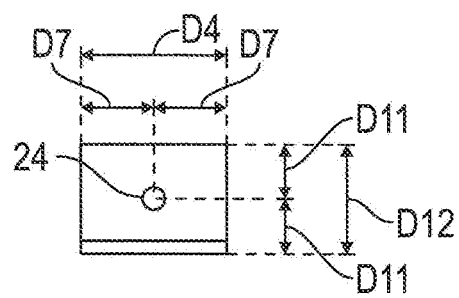
FIG. 2E is an end view taken along line C-C of FIG. 2C.
Figure 3:
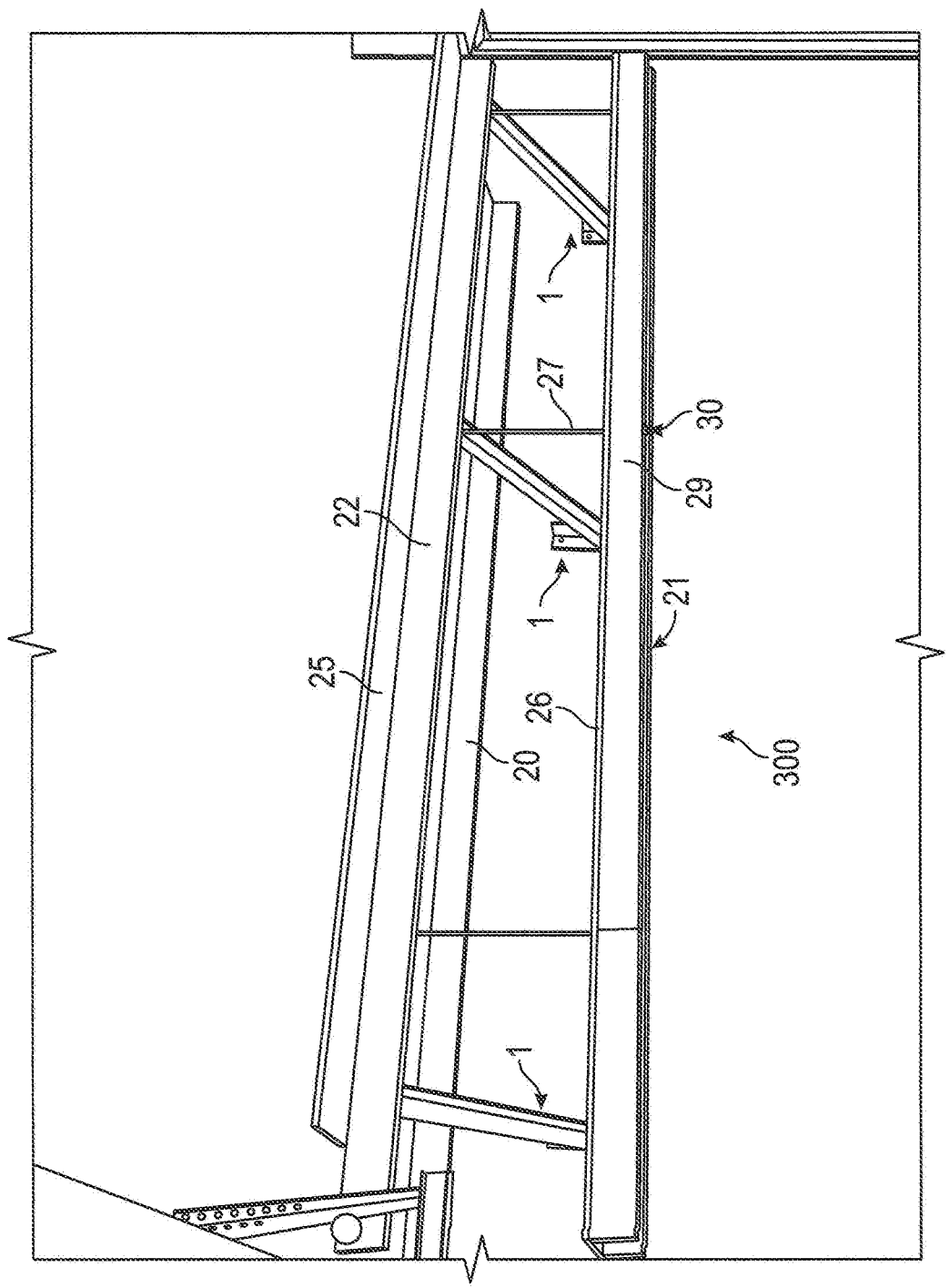
FIG. 3 is a front perspective view of a two shelf assembly using three shelf brackets.
Figure 4:
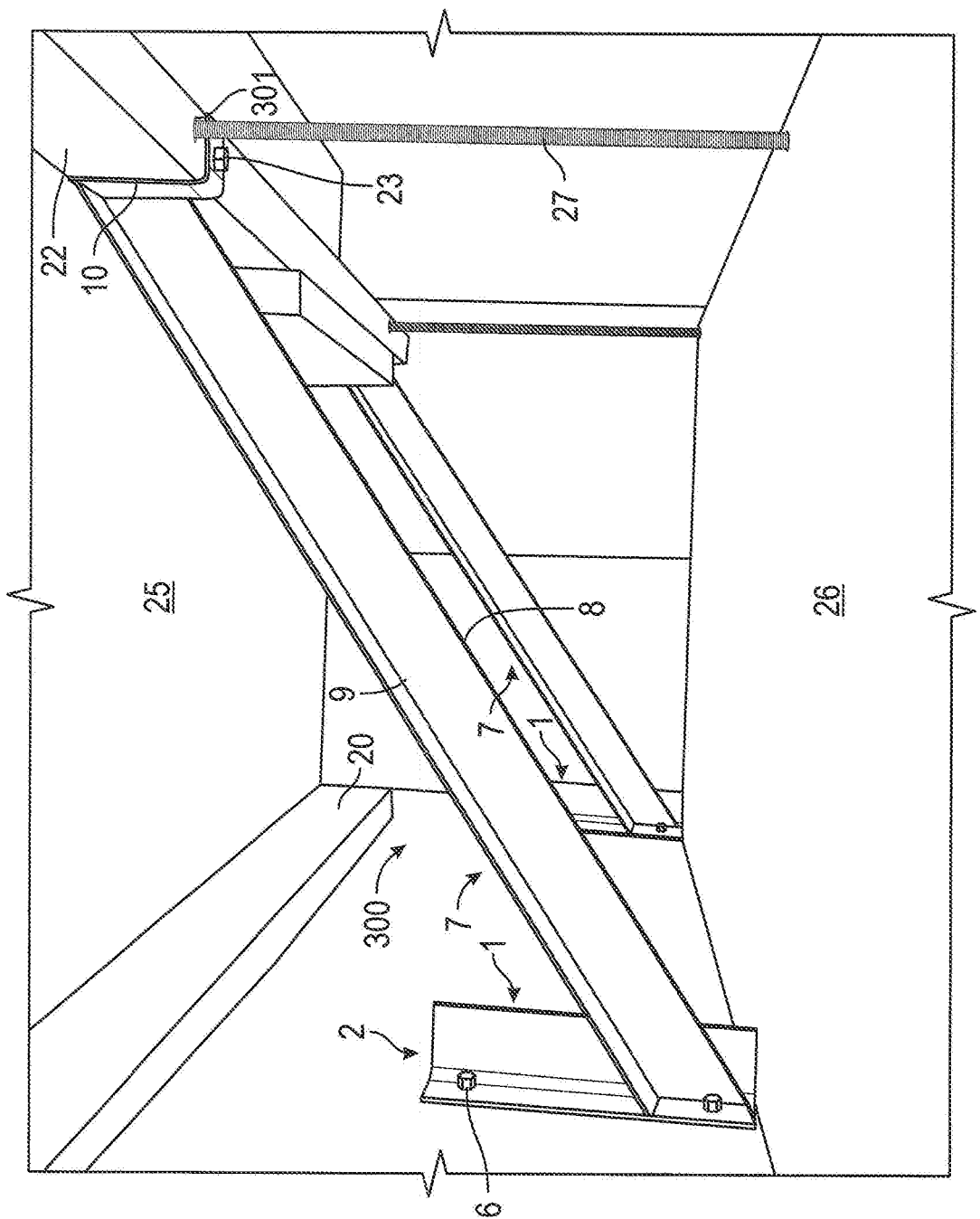
FIG. 4 is a left side perspective view of the two shelf assembly.

In FIGS. 3, 4 the shelf assembly 300 has three wall brackets 1 and is dimensioned as shown in FIGS. 2A, 2B. This alternate support for lower shelf 26 uses a second hole 301 for rod 27. A lag screw 23 threads up through hole 13 of horizontal leg 12. The embodiment of FIG. 2A does not require hole 301. In either case the height of the lower shelf below the upper shelf is selected by the user. This is also true for any lower shelves.

Figure 5:
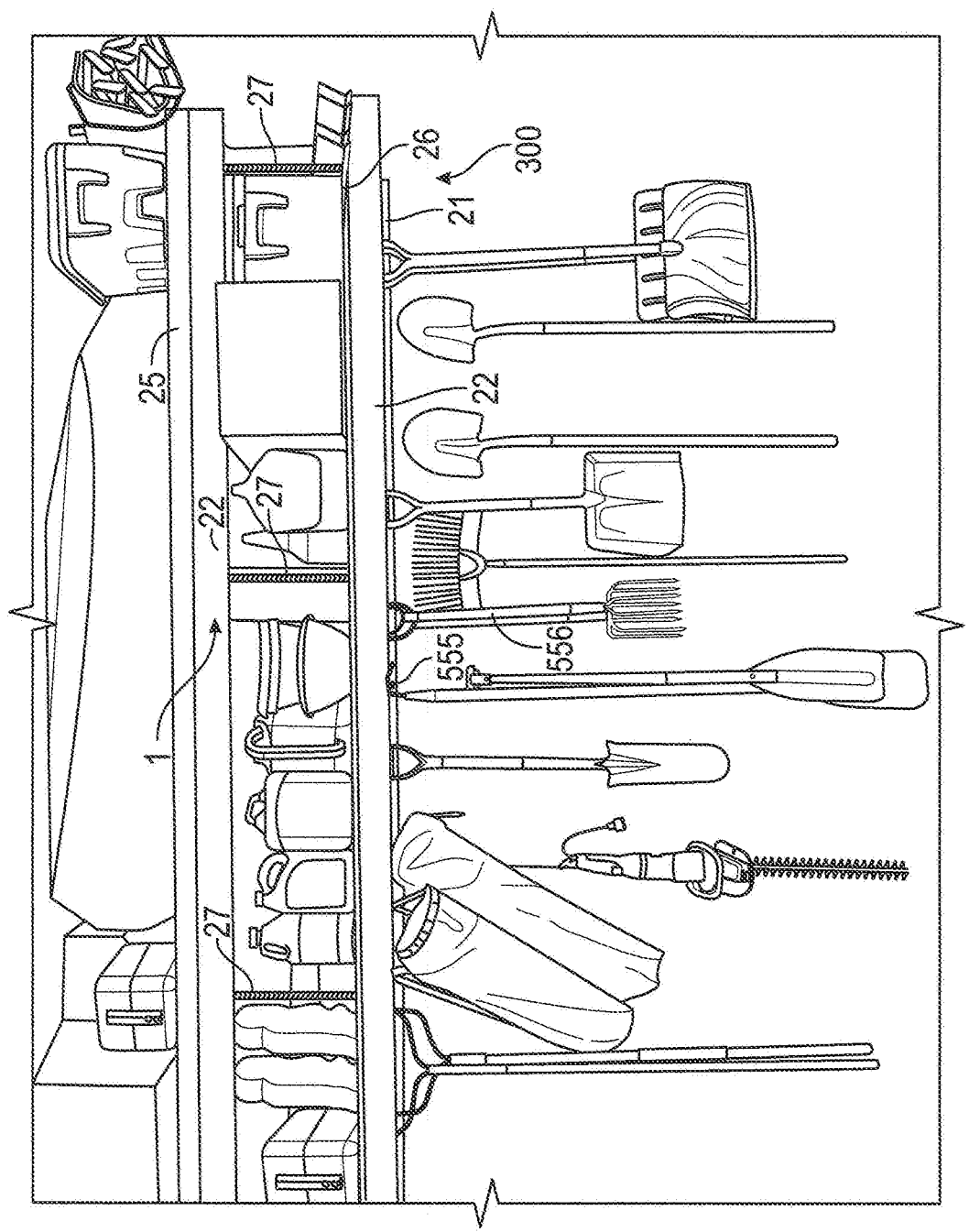
FIG. 5 is a front elevation view of the two shelf assembly in use.
Figure 6:
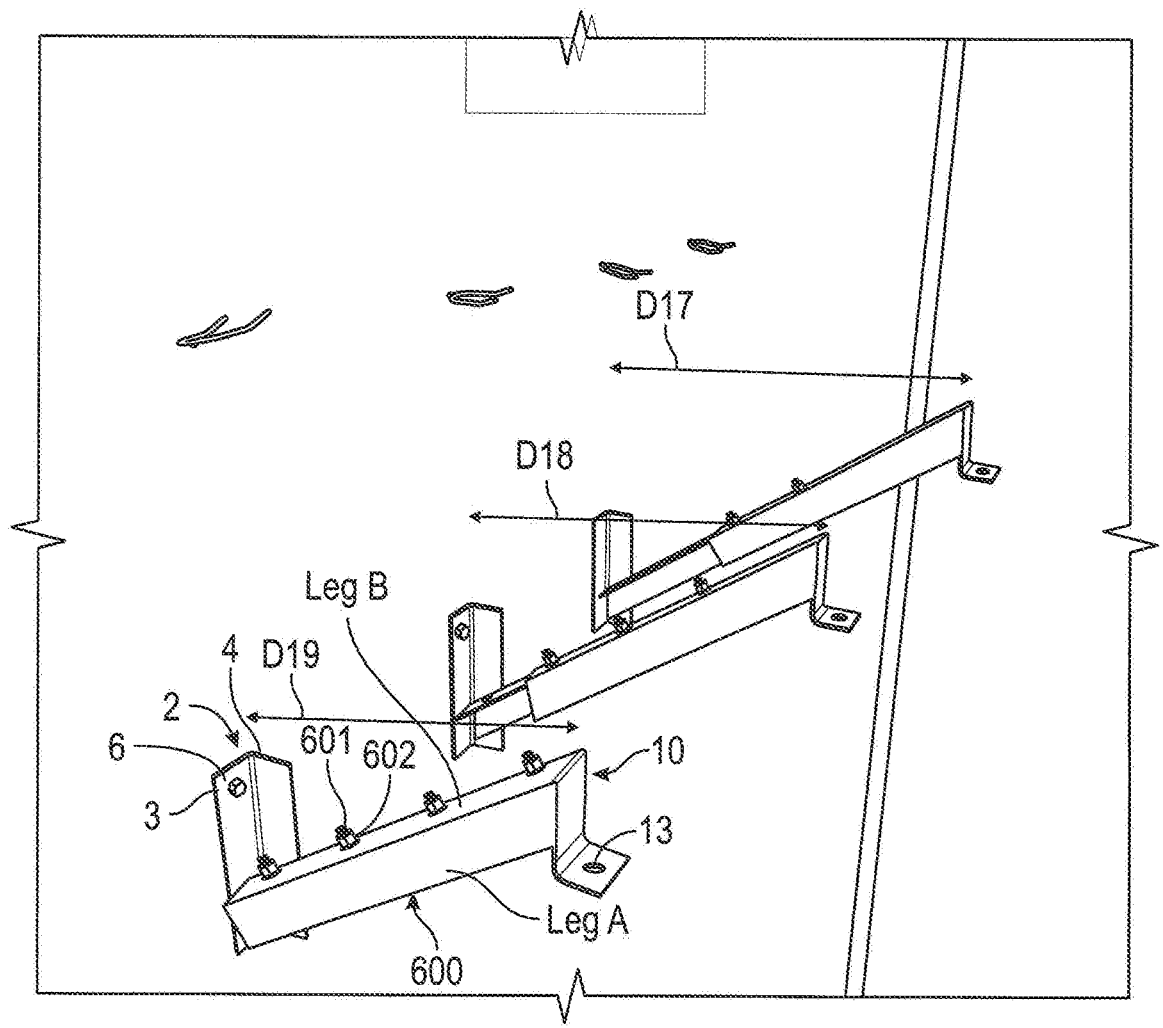
FIG. 6 is a left side perspective view of an extendable diagonal strut bracket.

In FIG. 5 shelf assembly 300 can support hundreds of pounds of weight. Hooks 555 can screw into lower support beam 21 and support hardware 556.

Referring next to FIGS. 6,7,8A,8B,8C,8D an extendable bracket 600 has a leg B that supports the L shaped hanger bracket 10 that slides on the fixed Leg A that is welded to wall mounted bearing plate 2. Bolts 601 with nuts 602 lock Leg A to Leg B along selected holes A1-A4 in Leg B and holes B1-B4 in Leg B.

Figure 9:
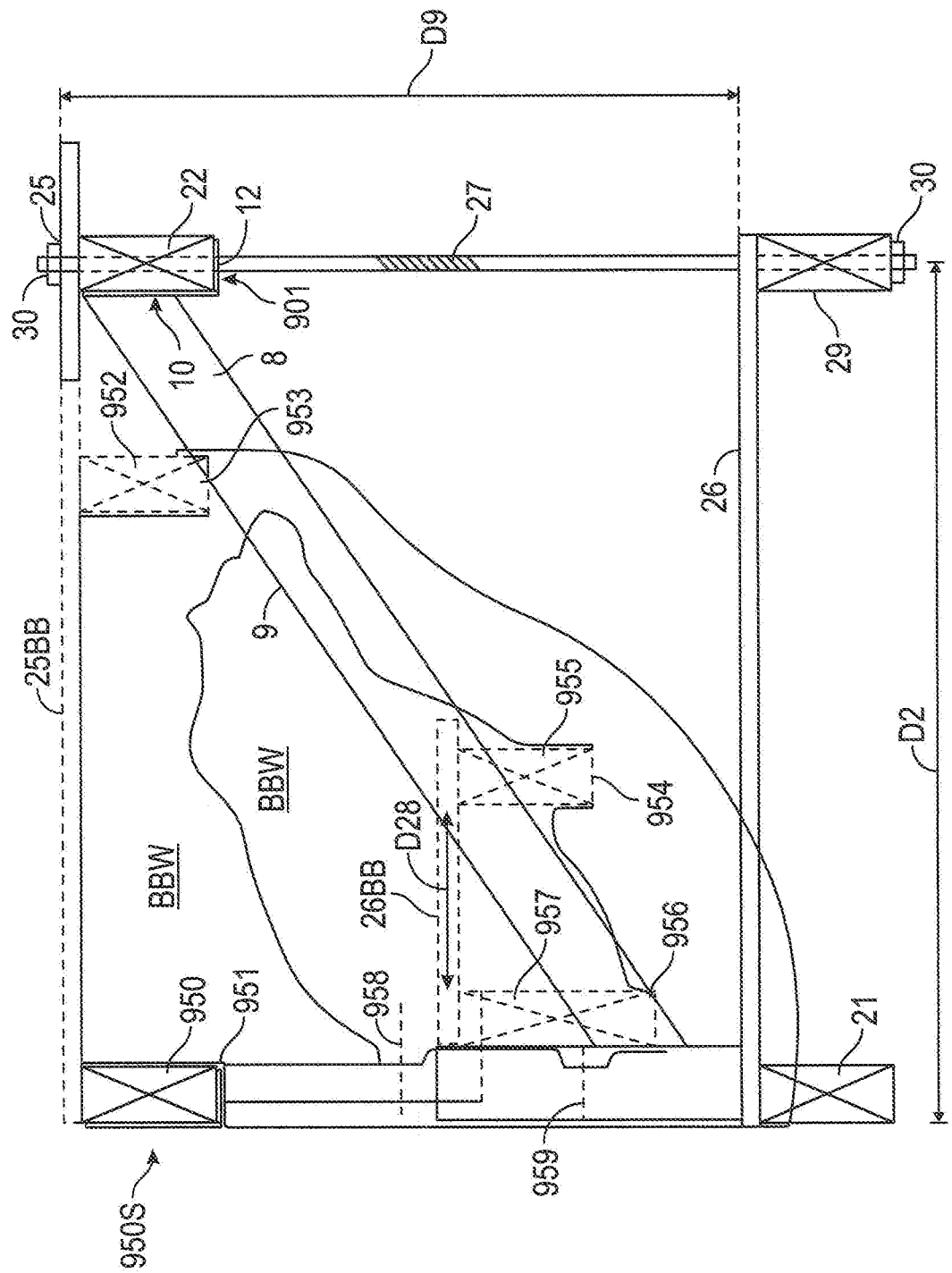
FIG. 9 is an overlay side elevation view of the "Big Bear" (BB) bracket (in dots) on the present invention bracket shown in FIG. 2.
Figure 10:
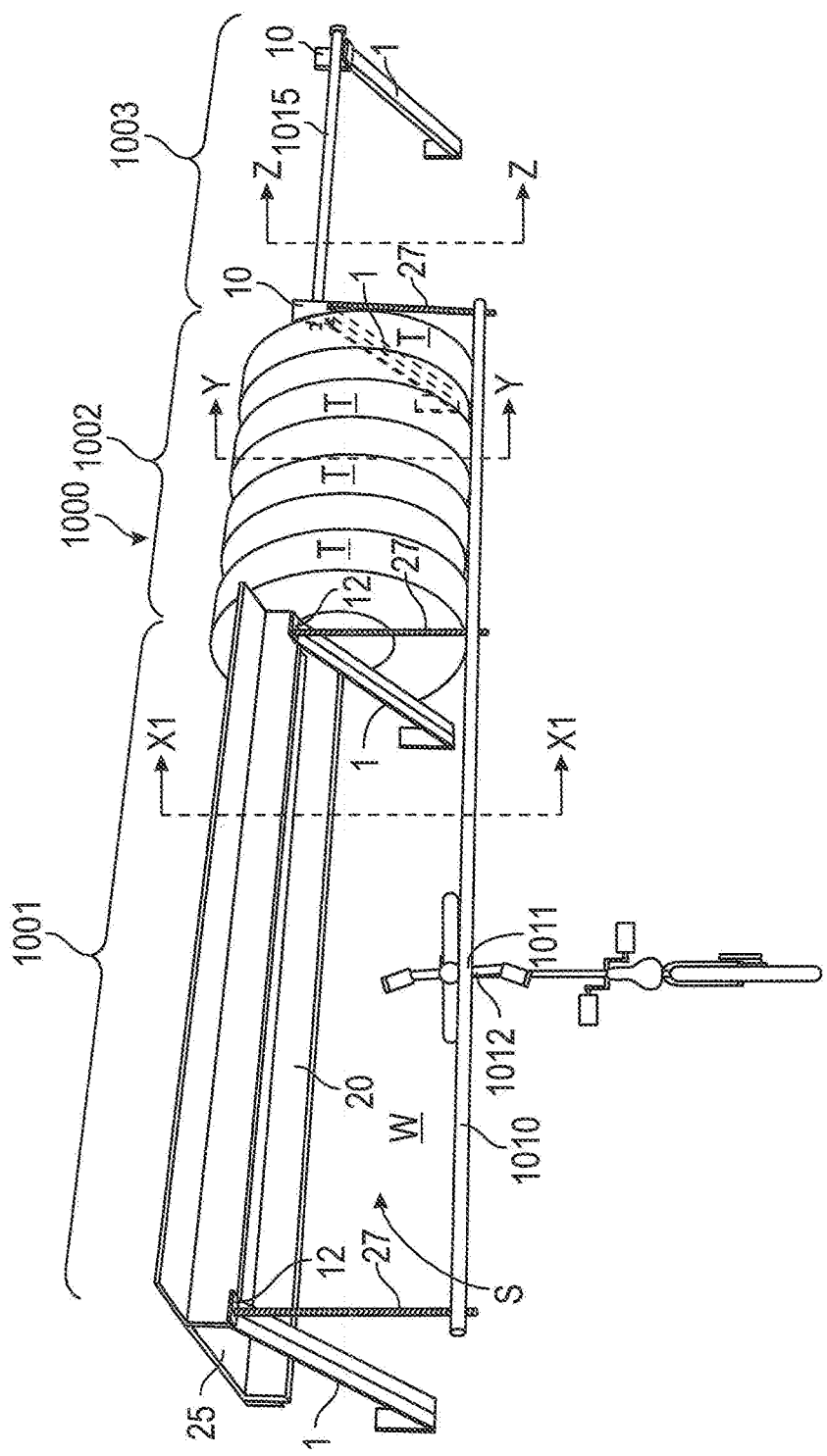
FIG. 10 is a front perspective view of a multi-purpose wall storage system.
Figure 11:
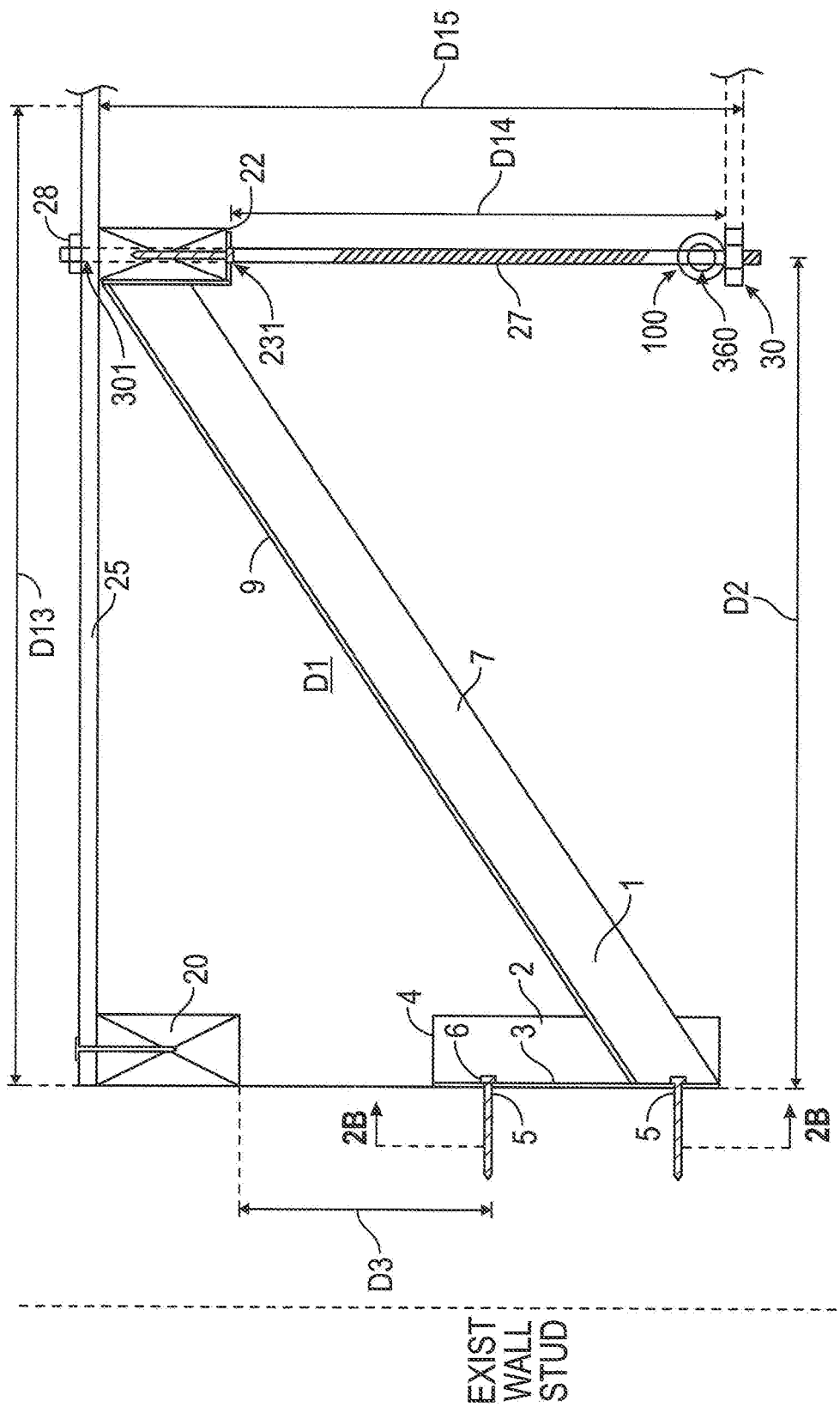
FIG. 11 is a sectional view along lines X1-X1 of FIG. 10.

Referring next to FIG. 9 the prior art "Big Bear" (BB) shelf bracket (U.S. Pat. No. 8,864,088) is shown with its shelves in dotted lines overlaid with the shelf bracket 1 shown in FIGS. 1,2 and shown in dotted lines in FIG. 9. The height DH is 7" from the top lag screws on the wall to the bottom of the L shaped hanger bracket 10. The BB height DBB is 5½" from the top screw 7" on the wall to the bottom of hanging cutout 953. The 2×4's 22 and 952 are the same. The present invention has a top shelf fully supported depth of 24 inches versus the BB top shelf of 18 inches. The present invention lower shelf is also fully supported at 24 inches, having a variable height below the top shelf. The BB lower shelf is 9 inch depth and fixed in height down from the upper shelf. It also leaves a gap to the wall behind the lower shelf.

The BB wall cutout 951 supports 2×4 950 only with a wood screw 950 S.

The BB wall brace BBW has screw holes 958,959. The lower shelf lumber beam 957 is a 2×6 inch board. The lower shelf cutout for the 2×6 board is labeled 956. The lower shelf outboard cutout is labeled 954 to secure a standard 2×4 labeled 955. The fixed height lower shelf 26BB is nine inches deep.

This embodiment eliminates the lag screws 231 of FIG. 2A. Instead the rod 27 passes through a hole 901 in the bottom leg 12 of the L shaped bracket 10 and then through the support beam 22. Nuts 902 secure both ends of the rod 27. Nominal dimensions are:

D1=27"
D2=24"
D3=7"
D4=2"
D5=8"
D6=6"
D7=1"
D8=⅛" plate
D9=3½"
D10=1½"
D11=¾"
D12=1½"
D13=32"
Nail 8=#8×2½"-8" o.c-each end each shelf
D14=14"
D15=18" min
D16=½
LAG1=⅜" to existing wall stud
LAG2=⅜" at 16" o.c. or better
D17=24"
D18=20"
D19=16"
D20=17"
D21=1¾"
D22=4¹¹⁄₁₆"
D23=1³⁄₁₆"
holes=⁷⁄₁₆"
D24=⅛"
D25=1⁷⁄₁₆"
D26=1³⁄₁₆"
D27=¹³⁄₁₆"
D28=9"

Referring next to FIGS. 11-14 a multi-mode wall storage systems 1000 and 1600 are disclosed. Module 1004 on FIG. 14 maintains the upper plank 20 and a top shelf 25 and a plank 22 supported by the L brackets 10. The rods 27 support a crossbar 1010. This crossbar 1010 can be used as a hanging storage bar for bike 1011 or a chin up bar. The bike 1011 hangs from the pocket by the handlebar and sprocket 1012 as the handlebars are turned parallel the frame as shown.

Module 1002 eliminates the top shelf to support tires T wedged against the wall W and the crossbar 1010. Not shown are smaller tires that could be stored in space S under shelf 25.

Module 1003 does not need any planks at all. The crossbar 1015 is supported by the L brackets 10.

Not shown could be a continuous two shelf module as shown in FIG. 3.

Figure 12:
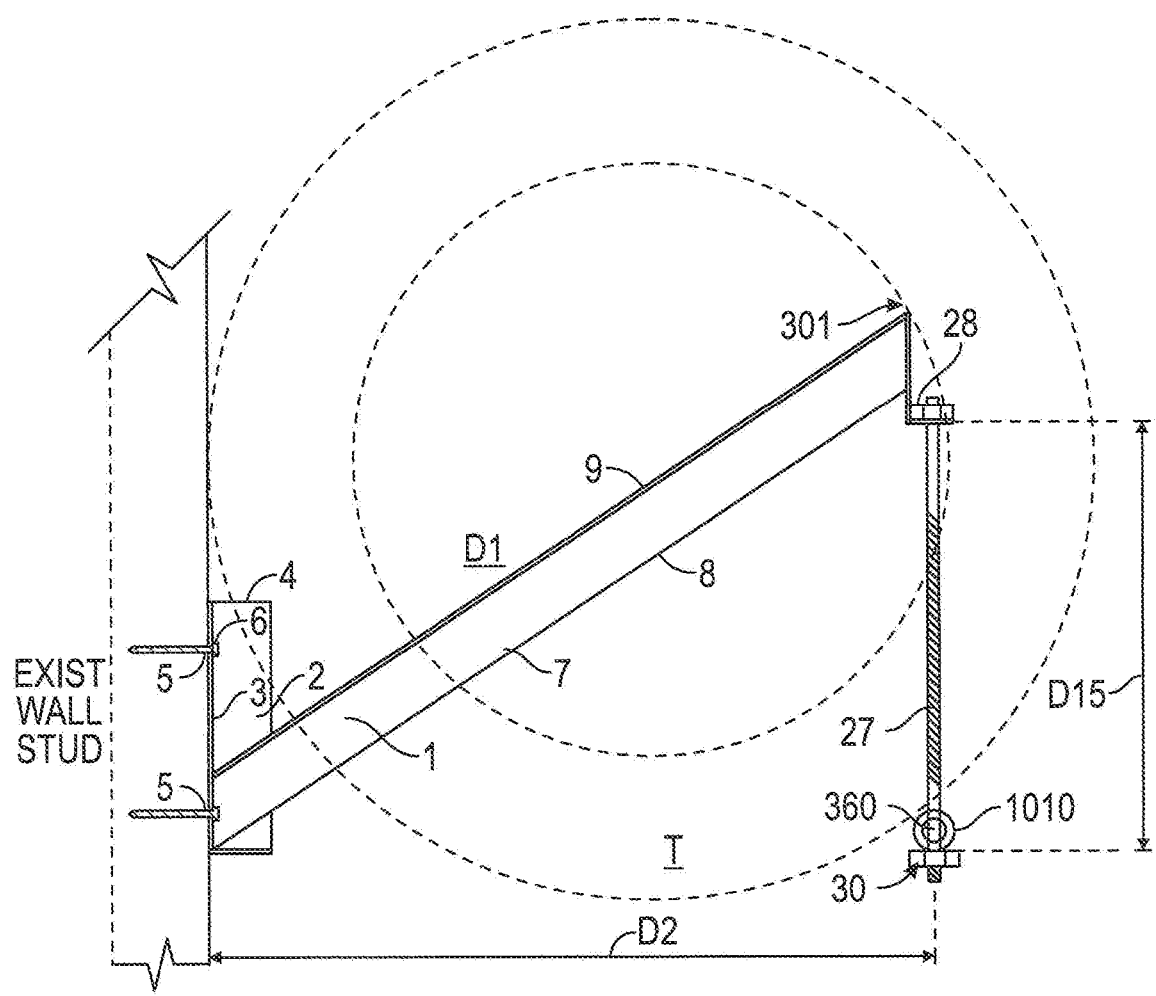
FIG. 12 is a sectional view along lines Y-Y of FIG. 10.
Figure 13:
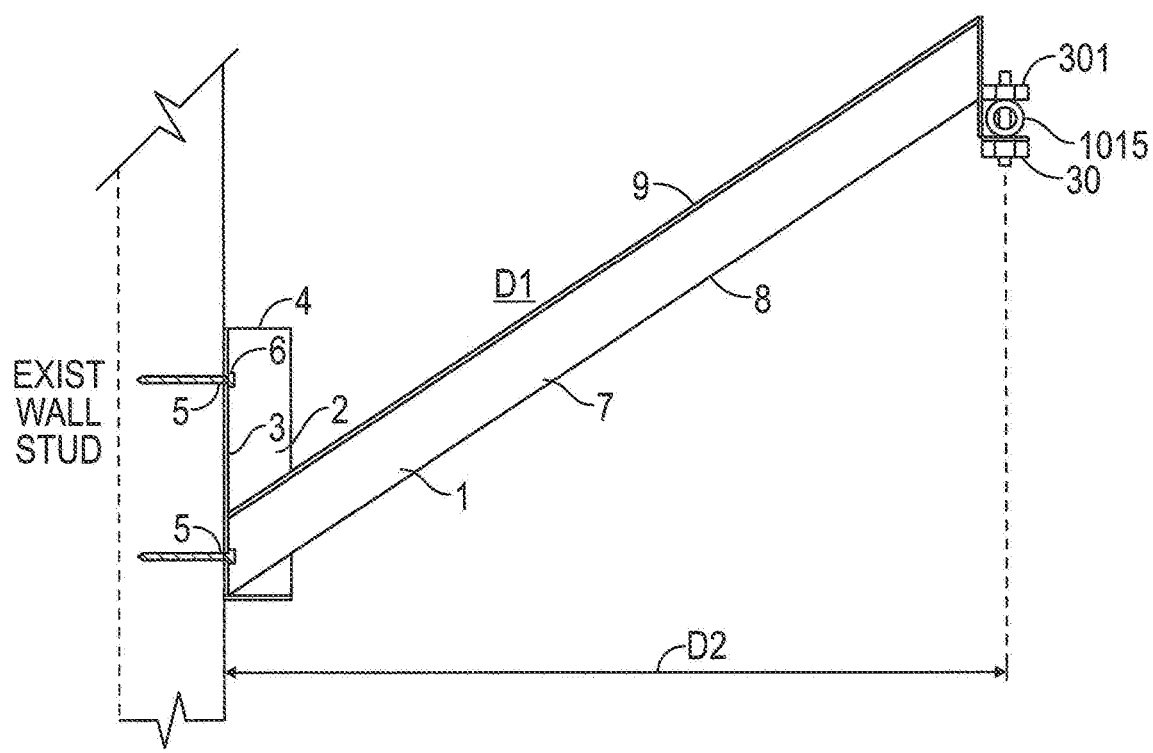
FIG. 13 is a sectional view along lines Z-Z of FIG. 10.
Figure 14:
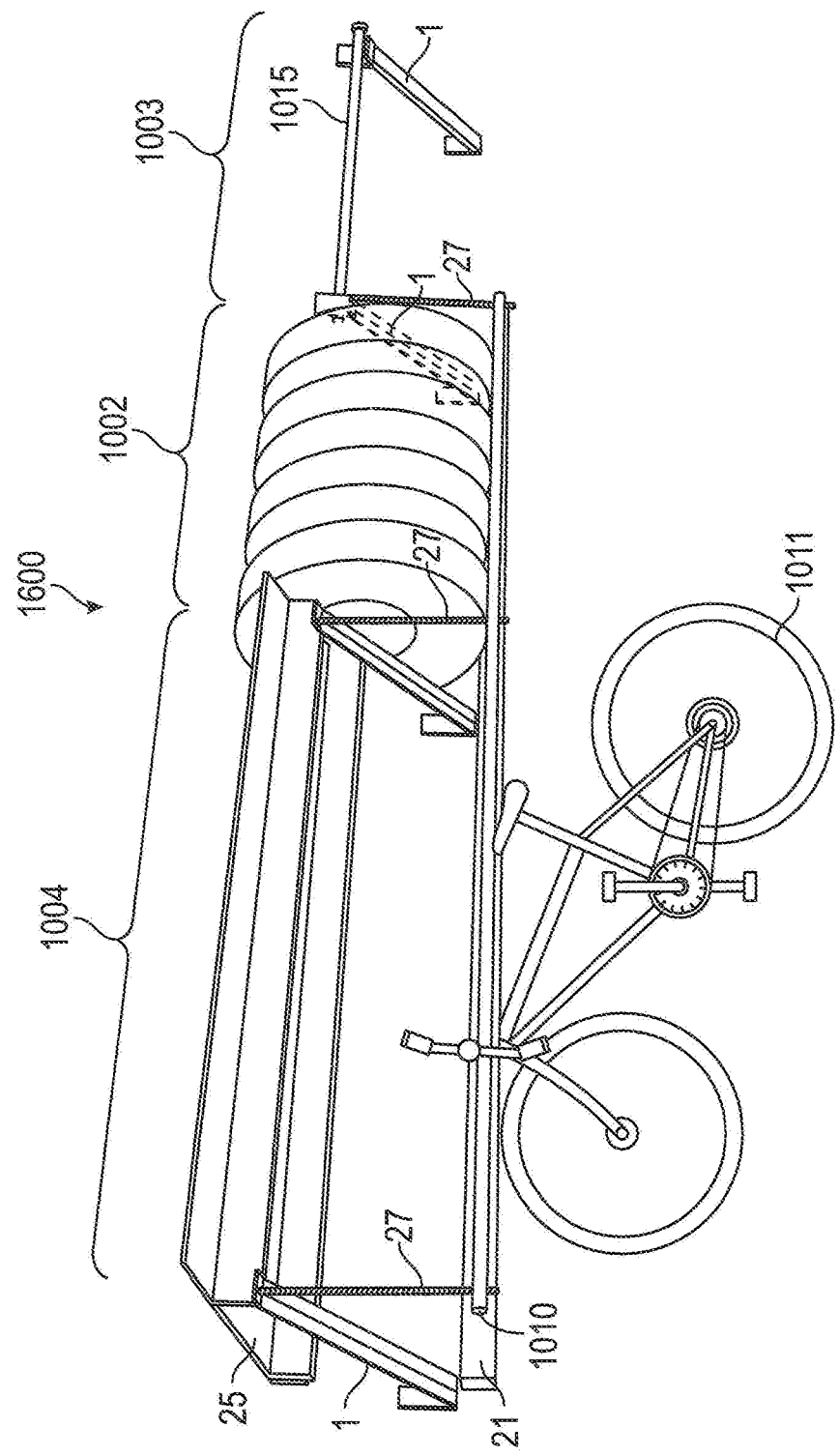
FIG. 14 is a top perspective view of a removed lower shelf embodiment 1600.

FIG. 12 shows hole 360 in crossbar 1010. FIG. 13 shows crossbar 1015 having hole 360 with bolt 301 secured by nut 30. FIG. 14 shows the bike 1011 hanging between a wall plank 21 and crossbar 1010. The FIG. 14 system is labeled 1600 with new module 1004.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A platform for a wall shelf, the platform comprising:
   A) A first bracket for a wall mounted top shelf, the first bracket comprising:
   a vertical wall mountable bearing plate having an upper and a lower mounting hole and a 90 degree stiffening segment;
   a diagonal strut welded to the 90 degree stiffing segment and projecting upward at an acute angle from the lower segment of the vertical wall mountable bearing plate so as to locate a distal end thereof at least about three inches above the upper mounting hole;
   an L shaped hanger bracket welded to the distal end of the diagonal strut sized to support an outer horizontal plank;

B) a second bracket identical to the first bracket and mounted at a same height and apart from the first bracket;

C) an outer plank straddling the two L shaped hanger brackets;

D) a wall mounted inner edge support plank mounted above the two brackets at a same height as the outer plank; and E) a shelf supported by the wall mounted inner edge support plank and the outer plank.

2. The platform of claim 1 further comprising a lower shelf supported in part by the outer plank.

* * * * *